United States Patent Office 3,829,331
Patented Aug. 13, 1974

3,829,331
SODIUM BORATE GLASS COMPOSITIONS AND BATTERIES CONTAINING SAME
Floris Y. Tsang, Concord, Calif., assignor to The Dow Chemical Company, Midland, Mich.
No Drawing. Filed Dec. 30, 1971, Ser. No. 214,453
Int. Cl. H01m *3/00;* C03c *3/00, 13/00*
U.S. Cl. 136—146          5 Claims

ABSTRACT OF THE DISCLOSURE

An amorphous glass system based on sodium borate, which may also contain additives to modify viscosity, expansion coefficient, and the like, has found particular utility as the membrane material in alkali metal-sulfur batteries due to its inertness towards sodium, sulfur and sodium sulfide, as well as its excellent ability to conduct sodium ions.

BACKGROUND OF THE INVENTION

A significant development in the area of battery cells, particularly secondary battery cells (cells which can be discharged and electrically recharged numerous times without injury to the cell) has been the introduction of alkali metal-sulfur batteries. U.S. Pat. 3,404,035 and 3,476,602 are examples of this new technology.

This type of cell generally consists of a liquid anode (a melt consisting of one or more alkali metals, alkali metal amalgams, or alkali metal alloys); a liquid or paste sulfur cathode (some of which is melted and in which the cations of the metal are dispersed); and an electrolyte-separator or membrane which is selectively permeable to the cations of the metal and which separates the anode and cathode. This membrane is further adapted to transmit ions of the anode metal between the anode and cathode compartments without transmitting, to any appreciable extent, electrons, molecules of the anode metal, or ions or molecular species of the cathode. The anode, cathode, and membrane elements are typically positioned within a liquid and vapor tight case. Electrically-conducting leads are attached to the anode and cathode to complete the battery unit.

Typically, these batteries have utilized a liquid sodium anode, a liquid sulfur-sodium sulfide mixture, e.g., a sodium polysulfide, as the cathode, and a sodium ion conductive glass as the membrane. As a cathode, sodium sulfide dissolved in, or in admixture with, sulfur has been discovered to be especially suitable inasmuch as these two components form mixtures that become liquid at relatively low temperatures (a minimum temperature between about 270°-330° C.), and which also exhibit unexpectedly high electrical conductivity over broad ranges of compositions.

The sulfur-sodium sulfide mixture, when the battery cell is at full charge, has an empirical formula corresponding to about $Na_2S_{22}$. As electrical current is drawn from the cell, additional sodium sulfide is produced in the cathode compartment due to the migration of sodium ions from the anode through the membrane. Discharge of the battery is ordinarily stopped at or before the point when the composition of the cathode mixture approaches the empirical formula $Na_2S_3$ in order to insure satisfactory operability at relatively low temperatures. Hence, even at this comparatively high sodium to sulfur ratio, the cathode mixture is liquid at temperatures around 330° C. When discharge of the cell is stopped at the point when the cathode mixture corresponds to the empirical formula $Na_2S_4$, the minimum cell operating temperature can be reduced to 285° C. Finally, if operation of the cell at higher temperatures is not undesirable, discharging can be undertaken to a cathode composition corresponding to, for example, the empirical formula $Na_2S_2$, which is liquid at 560° C.

Electrolyte-separators or membranes suitable for use in these battery cells, then, must possess the ability to keep the liquid anode separated from the liquid cathode and they must be conductive, i.e., they must possess the ability to transmit ions of the anode metal between the anode compartment and the cathode compartment but they should not, in any substantial way, conduct electrons, the elemental anode metal, or the cathode material in either its molecular or ionic form. Furthermore, these membranes should resist degradation during operation, should be inert to chemical attack by the liquid components of the cell, and, preferably, should have high ionic conductivity.

To secure the greatest efficiency and the highest energy density, the electrolyte-separator is generally utilized in the form of thin membranes fabricated in various geometries and dimensions. Suitable membranes include flat plates, corrugated sheets, spirals, hollow fibers and other shapes designed to provide for ready anode metal ion transfer during battery operation, but which will keep the liquid anode and cathode materials separated.

Glasses and porcelain materials have been utilized by the art as the membrane material. Many silicate systems have been tried (e.g., $Na_2O \cdot 2SiO_2 \cdot \frac{1}{2}B_2O_3$), but have not proven satisfactory. It has been found that, depending upon $Na_2O$ content, they are not resistant enough to either sodium, sulfur or sulfide.

While sodium borates are known in crystalline or amorphous form (see, for instance, C. A. *37,* 2646[6]), there are no reported sodium borate-alkali halide amorphous glass systems. It has now been found that these systems are very suitable for utilization as the separator membrane in alkali metal-sulfur batteries.

DESCRIPTION OF THE INVENTION

The present invention provides an amorphous glass system based on sodium borate which may also contain additives to modify viscosity, expansion coefficient, and the like.

In one respect, the invention is a glass system which finds particular utility as a separator membrane in an alkali-sulfur battery cell, said glass being a sodium borate which may optionally contain sodium halide and other additives.

In another respect, the invention is an amorphous sodium borate/sodium halide glass system which may contain viscosity modifiers, and the like.

More particularly, the invention is an amorphous sodium borate glass system of the formula $Na_2O \cdot (2+a) \, B_2O_3 \cdot (b-c-e) \, NaX$
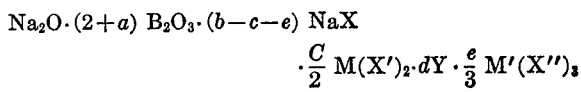
$\cdot \frac{c}{2} M(X')_2 \cdot dY \cdot \frac{e}{3} M'(X'')_3$ wherein, in said formula, $-0.5 < a < 2$;

$$0 < b \leq \left(\frac{1+a}{2}\right) + 0.3,$$

when X is F, or $$0 < b \leq \left(\frac{1+a}{6}\right) + 0.1,$$

when X is Cl or Br; $0 \leq c \leq b$; $0 \leq d \leq 1$; $0 \leq e \leq (b-c)$; M is Mg, Ca, Sr or Ba; M' is Al or Ga; Y is $SiO_2$ or $\frac{1}{2}P_2O_5$; and X, X' and X'' are, independently, Cl, Br or F.

The above glass system has been found to be chemically inert toward sodium, sulfur and sodium sulfide. Further, it demonstrates reasonably high sodium ion conductance. Therefore, this glass finds a specific utility as the separator membrane material for alkali metal-sulfur batteries, particularly when in the form of a fine, hollow fiber. It has also been found that the above glass system is suitable for use as a separator membrane when $b=0$.

For use as the membrane material in an alkali-sulfur battery cell, preferred ranges for those variables in the above formula are as follows:

$0 \leq a \leq 0.2$
$0.3 \leq b \leq 0.5$
$0 \leq c \leq 0.2$
$d$ and $e = 0$
$M = Mg$
$X$ and $X' = F$.

A preferred structure for a separator membrane produced from the glass of this invention is one or more very fine, hollow fibers having outside diameter-to-wall thickness ratios of about 3–20 and, desirably, about 4–10. When these ratios are present, hollow fibers having an outside diameter of about 20–1000 microns and a wall thickness of about 5–100 microns are normally employed. Such fibers can provide a high strength, thin-walled membrane which can promote a high ion conductivity, and supply a very large surface area-to-volume ratio. Although obviously less advantageous in the latter respect, hollow fibers having an outside diameter of 5000 microns with wall thicknesses of 1000 microns can be employed but the efficiency and energy density of the cell is substantially reduced.

SPECIFIC EMBODIMENTS

Example 1

Stoichiometric amounts of $Na_2CO_3$, $B_2O_3$, $NaF_2$ (as needed to prepare $Na_2O \cdot 2B_2O_3 \cdot 0.3NaF \cdot 0.1MgF_2$), in powder form, were weighed out, throughly dried and blended together. This mixture was placed in a platinum dish and the dish placed in a 900° C. oven. After the mix had completely melted, heating was continued for another 0.5 to 1 hour, the melt being occasionally stirred with a graphite rod. It was then poured onto a graphite plate and allowed to cool rapidly.

A clear glass resulted which had an expansion coefficient (0–300° C.) of $1.37 \times 10^{-5}/°$ C., an annealing point of 414° C., a softening point of 492° C. and a density of 2.4 gm./cc.

In a similar manner, the following glasses were also produced:

$Na_2O \cdot 2B_2O_3 \cdot 0.5NaF$
$Na_2O \cdot 2.14B_2O_3 \cdot 0.5NaF$
$Na_2O \cdot 7/3B_2O_3 \cdot 8/9NaF$
$Na_2O \cdot 2B_2O_3 \cdot 1/6NaF$
$Na_2O \cdot 2B_2O_3 \cdot 1/6NaCl$
$Na_2O \cdot 2B_2O_3 \cdot 1/6NaBr$
$Na_2O \cdot 2B_2O_3 \cdot 1/2NaBr$
$Na_2O \cdot 2.07B_2O_3 \cdot 1/2NaF$
$Na_2O \cdot 3B_2O_3 \cdot NaF$
$Na_2O \cdot 2B_2O_3 \cdot 0.3NaF\ 0.1BaF_2$
$Na_2O \cdot 2B_2O_3 \cdot 0.4NaF\ 0.05MgF_2$
$Na_2O \cdot 1.8B_2O_3 \cdot 0.2NaF$
$Na_2O \cdot 1.5B_2O_3 \cdot 0.2NaF$
$Na_2O \cdot 2B_2O_3 \cdot 0.2NaF\ 0.1AlF_3$

Example 2

The melt of $Na_2O \cdot 2B_2O_3 \cdot 0.5NaF$ prepared above was cooled to an appropriate viscosity (about $4 \times 10^3$ poises at 620° C.) and a hollow fiber was hand-drawn from it by standard glass blowing techniques. The fiber had an outside diameter of about $500\mu$ and an inside diameter of about $400\mu$.

A six-inch section of this fiber was then sealed at one end to form a suitable glass capillary for use in a lab-scale battery.

The battery was made as follows: A 12-inch length of 5 mil aluminum wire was inserted into the open end of the glass capillary and the assembly placed in an inert atmosphere box. The open end of the capillary was then placed in a pool of liquid sodium held at 150° C. The gas from the inside of the capillary was then removed by vacuum, and, when the vacuum was released, liquid soduim filled the capillary. This sodium-filled glass capillary tube, with the aluminum wire emerging from the open end, was then inserted, closed-end down, into a 1 cm. diameter test tube (8 inches long) that contained about 8 gm. of solid $Na_2S_4$.

10 mil stainless wire was inserted into the test tube alongside the glass capillary, and the two wires were brought out of the test tube through a rubber stopper. The wire from the sodium was the anode lead and the wire from the $Na_2S_4$ was the cathode lead. The bottom 4" of the test tube was then heated and maintained at 300° C., and a working battery model resulted. (See U.S. Pat. 3,476,602 for further details regarding construction of cells.)

Measuring the voltage across the anode and cathode leads gave about 2 volts. When this cell was discharged by placing a 1400 ohm resistor across the lead, 1.3 milliamperes of current was drawn. The terminal voltage showed 1.8 volts. Similarly, when the cell was charged by providing 1.3 milliampers charging current, the terminal voltage was 2.2 volts. Thus, the internal resistance of the cell was about 150 ohms.

The cell was automatically charged and then discharged at the above rate in .5-hour cycles. After about one week, it was disconnected and the glass capillary examined. It was not discolored and appeared strong.

Example 3

A capillary was hand-drawn from the glass
$$Na_2O \cdot 2B_2O_3 \cdot 1/6NaCl$$
and a cell made as in Example 2. This cell operated at a nominal 2 volts open circuit and invariant internal resistance for 13 months. During the 13 months, it was intermittently charged and discharged at about 1 milliampere.

Example 4

Two cells were built as in Example 2 using glass capillaries made from glass of the composition
$$Na_2O \cdot 2B_2O_3 \cdot 1/12NaBr.$$
These cells had the proper 2.0 volts open circuit voltage when first built and had internal resistances of about 200 ohms. After 13 months of operation, the cells exhibited no change in properties from the original.

Example 5

Five cells were built as in Example 2 using glass of the composition $Na_2O \cdot 2B_2O_3 \cdot 0.3NaF \cdot 0.1MgF_2$. All of these cells exhibited the proper 2 volts potential. They were then cycled (charged at 1.5 milliamperes for 2.5 hours, and then discharged at 1.5 milliamperes for 2.5 hours) for one month. The cell resistances were about 200 ohms at the beginning of the test, and also at the end of the one month test. Thus, the cell properties and characteristics remained invariant, showing no degradation.

Example 6

A cell built of glass as in Example 5, when fiirst built, had an internal resistance of 110–130 ohms. It was charged and discharged in 60-minute cycles at 2 milliamperes continuously for 4 months. At the end of that time the internal resistance was still 110–130 ohms, showing that no degradation of the glass had taken place.

Example 7

A cell built of glass as in Example 5 was kept at 300° C., but without substantial charging or discharging for 3 months. Its internal resistance was about 150 ohms. It was cooled to room temperature and then reheated. After reheating to 300° C., it had the same characteristics as originally, i.e., 2 volts open circuit voltage and about 150 ohms internal resistance. Thus, there was no degradation of the glass. It continued to function in this manner for 9 more months.

Example 8

To demonstrate the inertness of the glass of this invention to sulfur, one gram of ground $Na_2O \cdot 2B_2O_3 \cdot 0.5NaF$ glass (100–500 mesh) was placed in a large excess of sulfur (about 10 gm.) in an ampoule, which was then sealed and heated to about 300° C. for 3 days. After cooling, the contents of the ampoule were crushed and ground under water. The water was filtered from the ground glass and examined. It was colorless and contained no sulfide, sulfate, or sulfite ions. This proves that the glass did not react with the sulfur at 300° C. in 3 days.

The same procedure was carried out with a silicate glass of composition $Na_2O \cdot 2SiO_2 \cdot 0.5B_2O_3$ as a comparison. After 3 days with sulfur at 300° C., the sulfur-glass mixture was crushed under water. The water was separated by filtering. In this case the water was colored indicating the presence of polysulfide ion. Chemical tests proved the presence of sulfide and sulfate ion. Thus, the silicate glass was attacked by the sulfur.

Example 9

The test of Example 8 was carried out with two other glass compositions of this invention, i.e., $$Na_2O \cdot 2B_2O_3 \cdot \tfrac{1}{16}NaCl$$

and $Na_2O \cdot 2B_2O_3 \cdot \tfrac{1}{12}NaBr$. The filtered water contained no sulfide or sulfate, proving that the sulfur did not react with either the glasses.

I claim:

1. An amorphous sodium borate glass system of the formula $$Na_2O \cdot (2+a) \; B_2O_3 \cdot (b-c-e) \; NaX \cdot \tfrac{c}{2} M(X')_2 \cdot \tfrac{e}{3} Al(X'')_3$$

wherein, in the formula, $-0.5 < a < 2$;

$0 < b \leq \left(\tfrac{1+a}{2}\right) + 0.3$, when X is F;

$0 < b \leq \left(\tfrac{1+a}{6}\right) + 0.1$, when X is Cl or Br;

$0 \leq c \leq b$;

$0 \leq d \leq 1$;

$0 \leq e \leq (b-c)$;

M is Mg or Ba; and

X, X' and X'' are, independently, Cl, Br or F.

2. The composition of Claim 1 wherein, in the formula, $0 \leq a \leq 0.2$,
$0.3 \leq b \leq 0.5$,
$0 \leq c \leq 0.2$, $d$ and $e$ are 0, M is Mg and X and X' are F.

3. In a battery cell comprising a first oxidizable liquid metal electrode, a second fluid reducible electrode and a substantially fluid tight membrane separating said first and second electrodes, the improvement which comprises a separating membrane fabricated from an amorphous sodium borate glass composition of the formula $$Na_2O \cdot (2+a) \; B_2O_3 \cdot (b-c-e) \; NaX \cdot \tfrac{c}{2} M(X')_2 \cdot \tfrac{e}{3} Al(X'')_3$$

wherein, in the formula, $-0.5 < a < 2$;

$0 \leq b \leq \left(\tfrac{1+a}{2}\right) + 0.3$, when X is F;

$0 \leq b \leq \left(\tfrac{1+a}{6}\right) + 0.1$, when X is Cl or Br;

$0 \leq c \leq b$;

$0 \leq d \leq 1$;

$0 \leq e \leq (b-c)$;

M is Mg or Ba; and

X, X' and X'' are, independently, Cl, Br or F.

4. The battery of Claim 3 wherein, in the formula, $0 \leq a \leq 0.2$,
$0.3 \leq b \leq 0.5$,
$0 \leq c \leq 0.2$, $d$ and $e$ are 0, M is Mg and X and X' are F.

5. The battery of Claim 3 wherein the separating membrane is in the form of one or more fine hollow fibers having an outside diameter/wall thickness ratio of from about 3 to 20, ranging in outside diameter from about 20 to 1000 microns and a wall thickness of from about 5 to 100 microns.

References Cited

UNITED STATES PATENTS

| | | | |
|---|---|---|---|
| 2,430,539 | 11/1947 | Sun | 106—47 Q |
| 2,764,492 | 9/1956 | Weissenberg | 106—47 R |
| 2,946,694 | 7/1960 | Labino | 106—47 R |
| 3,215,543 | 11/1965 | Bre | 106—47 R |
| 3,390,021 | 6/1968 | Michael | 106—47 R |
| 3,404,035 | 10/1968 | Kummer et al. | 136—6 FS |
| 3,476,602 | 11/1969 | Brown et al. | 136—6 FS |

OTHER REFERENCES

Journal of The American Ceramic Society, vol. 37, pp. 238–239.

ALLEN B. CURTIS, Primary Examiner

H. A. FEELEY, Assistant Examiner

U.S. Cl. X.R.

106—47 R

PO-1050
(5/69)

UNITED STATES PATENT OFFICE
CERTIFICATE OF CORRECTION

Patent No. 3,829,331              Dated   August 13, 1974

Inventor(s)   Floris Y. Tsang

It is certified that error appears in the above-identified patent and that said Letters Patent are hereby corrected as shown below:

Column 3, line 31, after $B_2O_3$, line should read:

-- NaF and $MgF_2$ (as -- ;

Column 3, line 52 should read:

-- $Na_2O \cdot 2B_2O_3 \cdot 1/12NaBr$ -- ;

Column 5, line 6 after glass numbers in parentheses should be:

-- (100-150 mesh) --.

Signed and sealed this 26th day of November 1974.

(SEAL)
Attest:

McCOY M. GIBSON JR.
Attesting Officer

C. MARSHALL DANN
Commissioner of Patents

C-15,822